United States Patent
Mohan

(10) Patent No.: US 8,972,463 B2
(45) Date of Patent: Mar. 3, 2015

(54) METHOD AND APPARATUS FOR FUNCTIONAL INTEGRATION OF METADATA

(75) Inventor: Mukund Mohan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/894,136

(22) Filed: Sep. 29, 2010

(65) Prior Publication Data

US 2011/0022627 A1 Jan. 27, 2011

Related U.S. Application Data

(63) Continuation-in-part of application No. 12/179,903, filed on Jul. 25, 2008.

(51) Int. Cl.
*G06F 7/00* (2006.01)
*G06F 17/30* (2006.01)

(52) U.S. Cl.
CPC .................. *G06F 17/30604* (2013.01)
USPC .......................................................... 707/822

(58) Field of Classification Search
CPC ..................... G06F 17/30067; G06F 17/30091
USPC .................................................. 707/769, 822
See application file for complete search history.

(56) References Cited

U.S. PATENT DOCUMENTS

| | | | |
|---|---|---|---|
| 6,574,619 B1 | 6/2003 | Reddy et al. | |
| 6,615,253 B1 | 9/2003 | Bowman-Amuah | |
| 6,718,320 B1 | 4/2004 | Subramanian et al. | |
| 6,785,667 B2 | 8/2004 | Orbanes et al. | |
| 6,947,929 B2 * | 9/2005 | Bruce et al. | 1/1 |
| 7,035,855 B1 | 4/2006 | Kilger et al. | |
| 7,133,865 B1 | 11/2006 | Pedersen et al. | |
| 7,249,241 B1 | 7/2007 | Chu et al. | |
| 7,257,597 B1 | 8/2007 | Pryce et al. | |
| 7,533,107 B2 | 5/2009 | Gupta et al. | |
| 7,533,122 B2 | 5/2009 | Drumm et al. | |

(Continued)

FOREIGN PATENT DOCUMENTS

WO WO2005019997 3/2005
WO WO2005106711 11/2005

OTHER PUBLICATIONS

Inmon, "DW 2.0—Architecture for the Next Generation of Data Warehousing," DM Review Magazine, Apr. 2006.

(Continued)

*Primary Examiner* — Rehana Perveen
*Assistant Examiner* — Mark E Hershley
(74) *Attorney, Agent, or Firm* — Sughrue Mion, PLLC

(57) ABSTRACT

A computer implemented method for functional integration of metadata for a plurality of databases, includes: creating a single set of classes and instances for the classes for metadata of at least one relational data schema and at least one non-relational data schema for the plurality of databases; defining semantic relationships between the instances based on the structural information in the relational data schema and the non-relational data schema for the plurality of databases; associating the semantic relationships with a property class; creating a single set of triples for the semantic relationships between the instances; storing the single set of triples in a file; and using the set of triples stored in the file to navigate between the plurality of databases to formulate a response to a query.

19 Claims, 11 Drawing Sheets

(56) References Cited

U.S. PATENT DOCUMENTS

| | | | |
|---|---|---|---|
| 7,680,879 | B2 | 3/2010 | Battat et al. |
| 7,720,803 | B2 | 5/2010 | Unnebrink et al. |
| 7,836,097 | B2 | 11/2010 | Blackstone et al. |
| 7,840,589 | B1 | 11/2010 | Holt et al. |
| 7,865,461 | B1* | 1/2011 | Best et al. ............ 707/610 |
| 2002/0059566 | A1* | 5/2002 | Delcambre et al. .......... 717/146 |
| 2002/0169788 | A1 | 11/2002 | Lee et al. |
| 2003/0018616 | A1* | 1/2003 | Wilbanks et al. ............ 707/2 |
| 2003/0140308 | A1 | 7/2003 | Murthy et al. |
| 2004/0034651 | A1* | 2/2004 | Gupta et al. ............ 707/102 |
| 2004/0054683 | A1 | 3/2004 | Nishizawa et al. |
| 2004/0064456 | A1* | 4/2004 | Fong et al. ............ 707/100 |
| 2004/0122646 | A1 | 6/2004 | Colossi et al. |
| 2004/0139095 | A1 | 7/2004 | Trastour et al. |
| 2005/0043940 | A1 | 2/2005 | Elder |
| 2005/0102297 | A1 | 5/2005 | Lloyd et al. |
| 2005/0216500 | A1 | 9/2005 | Edelstein et al. |
| 2005/0273314 | A1 | 12/2005 | Chang et al. |
| 2006/0038084 | A1 | 2/2006 | Fussell et al. |
| 2006/0136376 | A1 | 6/2006 | Jain et al. |
| 2006/0136452 | A1 | 6/2006 | Lim et al. |
| 2006/0143239 | A1 | 6/2006 | Battat et al. |
| 2006/0167856 | A1 | 7/2006 | Angele et al. |
| 2006/0218157 | A1 | 9/2006 | Sourov et al. |
| 2007/0136323 | A1 | 6/2007 | Zurek et al. |
| 2007/0156623 | A1 | 7/2007 | Zhang |
| 2007/0203923 | A1* | 8/2007 | Thomas ............ 707/100 |
| 2007/0208697 | A1* | 9/2007 | Subramaniam et al. .......... 707/3 |
| 2007/0260620 | A1* | 11/2007 | Smolen et al. ............ 707/100 |
| 2008/0021888 | A1 | 1/2008 | Miller |
| 2008/0027981 | A1 | 1/2008 | Wahl |
| 2008/0040308 | A1 | 2/2008 | Ranganathan |
| 2008/0059524 | A1 | 3/2008 | Biedenstein et al. |
| 2008/0077598 | A1 | 3/2008 | Wilmering et al. |
| 2008/0168420 | A1 | 7/2008 | Sabbouh |
| 2008/0243908 | A1 | 10/2008 | Aasman et al. |
| 2009/0024590 | A1* | 1/2009 | Sturge et al. ............ 707/3 |
| 2009/0043730 | A1 | 2/2009 | Lavdas et al. |
| 2009/0070391 | A1 | 3/2009 | Blair et al. |
| 2009/0077094 | A1* | 3/2009 | Bodain ............ 707/10 |
| 2009/0144293 | A1 | 6/2009 | Chowdhury |
| 2009/0150367 | A1 | 6/2009 | Melnik et al. |
| 2010/0049728 | A1 | 2/2010 | Chiticariu et al. |
| 2010/0138366 | A1 | 6/2010 | Zhang |
| 2010/0192057 | A1 | 7/2010 | Majidian |

OTHER PUBLICATIONS

"The Associative Model of Data," White Paper, LazySoft Technology, 2003 Answerbrisk Ltd.

"Limitations of a Relational Model," Dec. 11, 2005: slides20: 1 of 18.

Vesset et al., "Operational Intelligence: A Process-Aligned Collaborative Environment," Adapted from Intelligent Process Automation: To Make Business Processes Intelligent Means Making Business Intelligence Operational, IDC #34767, Sponsored by InetSoft, Jun. 2006.

Hu et al., "Research and Implementation of Domain-Specific Ontology Building from Relational Database," The Third ChinaGrid Annual Conference, 2008 IEEE.

Nyerges, "Schema integration analysis for the development of GIS databases," International Journal of Geographical Information Science, vol. 3, Issue 2 Apr. 1989, pp. 153-183.

Zhou et al., "Tool for Translating Relational Databases Schema into Ontology for Semantic Web," 2010 Second International Workshop on Education Technology and Computer Science, 2010 IEEE.

McGuinness et al., Web Ontology Language (OWL), Sep. 6, 2007.

Duong et al., "XML Database Schema Integration Using XDD," Lecture Notes in Computer Science, Advances in Web-Age Information Management, vol. 2762/2003.

Schreiber, Z. Ph.D., Semantic Information Management (SIM): Solving the Enterprise Data Problem by Managing Data Based on its Business Meaning, Unicorn White Paper, 2003.

Imhoff, Claudia, Active Data Warehousing • the Ultimate Fulfillment of the Operational Data Store, 2001, Intelligent Solutions, Inc.

Berners-Lee, Tim et al., Semantic Data Integration for the Enterprise—Oracle Semantic Technologies, Jan. 14, 2009, semanticuniverse.com/articles-semanticuniverse.

Inmon, Bill, The Changing World, Part 1, Oct. 26, 2006, www.b-eye-network.com/print/3472.

Inmon, W.H., The Global Data Warehouse in DW2.0, Inmon Data Systems, 2006.

Building the Data Warehouse, Fourth Edition, Wiley Publishing, Inc., 2005, 3 pages.

Dan Vesset et al., Operational Intelligence: A Process-Aligned Collaborative Environment, IDC Vendor Spotlight Sponsored by InetSoft, Jun. 2006.

Astrova, et al., "Storing OWL Ontologies in SQL Relational Databases", World Academy of Science, Engineering and Technology, 5, 2007, pp. 167-172.

* cited by examiner

| Attribute Name | Attribute Value |
|---|---|
| Report_Name | EOQ_Report |
| Filter_Parameter | Category |
| Query_File_Name | Eoq-category.sql |
| Query_File_Location | C:\ |

Report: EOQ_Report

Cube: Sales_Analysis

| Class | Instance |
|---|---|
| Databases | ABC_DB |
| Tables | CUSTOMERS |
| Tables | ORDERS |
| Tables | ORDER_DETAILS |
| Tables | ITEMS |
| Tables | SHIP_TO |
| Columns | CUST_ID |
| Columns | CUST_TYPE |
| Columns | COMPANY_NM |
| Columns | ADDRESS |
| Columns | CITY |
| Columns | STATE |
| Columns | ZIP |
| Columns | YTD_SALES |
| Columns | ORDER_ID |
| Columns | CUST_ID |
| Columns | ORDER_DATE |
| Columns | ZIP |
| Columns | FREIGHT_CHARGES |
| Columns | ORDER_POSTED_DT |
| Columns | ORDER_SHIP_DT |
| Columns | ORDER_ID |
| Columns | ITEM_ID |
| Columns | ITEM_QTY |
| Columns | ITEM_ID |
| Columns | ITEM_DESC |
| Columns | ITEM_CATEGORY |
| Columns | ITEM_RATING |
| Columns | UNIT_PRICE |
| Columns | ON_HAND_INVENTORY |
| Columns | ORDER_SHIP_DT |

FIG. 5

| Class | Instance |
|---|---|
| Columns | SHIP_ID |
| Columns | ORDER_ID |
| Columns | CUST_ID |
| Columns | SHIP_TO_ADDRESS |
| Columns | STATE |
| Columns | ZIP |
| Columns | IN_CARE_OF |
| Columns | SHIPPING_CHANGE_DT |
| Cubes | Sales_Analysis |
| Fact_Tables | Sales_Fact |
| Dimension_Tables | Customer_Dim |
| Dimension_Tables | Item_Dim |
| Dimension_Tables | Salesman_Dim |
| Dimension_Tables | Time_Dim |
| Dimension_Members | TIME_ID |
| Dimension_Members | DATE |
| Dimension_Members | CUSTOMER_ID |
| Dimension_Members | CUSTOMER_NM |
| Dimension_Members | CUST_TYPE |
| Dimension_Members | ITEM_ID |
| Dimension_Members | ITEM_NM |
| Dimension_Members | SALESMAN_ID |
| Dimension_Members | SALESMAN_NM |
| Fact_Measures | SALES_AMT |
| Report_Names | EOQ_Report |
| Report_Attributes | Company_Name |
| Report_Attributes | Category |
| Report_Attributes | Item_Description |
| Report_Attributes | Date |
| Report_Attributes | Sales_Amount |
| Report_Attributes | Sales_Quantity |

FIG. 5 (Con't)

| | Class | Instance | |
|---|---|---|---|
| 522 | | | 521 |
| 524 | Filter_Parameters | Category | 523 |
| 526 | Query_File_Names | Eoq-category.dot.sql | 525 |
| | Query_File_Locations | C.colon.slash | |
| 528 | *Property* | hasTable | 527 |
| | *Property* | hasColumn | |
| | *Property* | hasMeasure | |
| | *Property* | hasKey | |
| | *Property* | hasDimension | |
| | *Property* | hasMember | |
| | *Property* | hasAttribute | |
| | *Property* | hasFilterParam | |
| | *Property* | hasQueryFile | |

FIG. 5 (Con't)

| Domain | Property | Range |
|---|---|---|
| ABC_DB | hasTable | CUSTOMERS |
| ABC_DB | hasTable | ORDERS |
| ABC_DB | hasTable | ORDER_DETAILS |
| ABC_DB | hasTable | ITEMS |
| ABC_DB | hasTable | SHIP_TO |
| CUSTOMERS | hasColumn | CUST_ID |
| CUSTOMERS | hasColumn | CUST_TYPE |
| CUSTOMERS | hasColumn | COMPANY_NM |
| CUSTOMERS | hasColumn | ADDRESS |
| CUSTOMERS | hasColumn | CITY |
| CUSTOMERS | hasColumn | STATE |
| CUSTOMERS | hasColumn | ZIP |
| CUSTOMERS | hasColumn | YTD_SALES |
| ORDERS | hasColumn | ORDER_ID |
| ORDERS | hasColumn | CUST_ID |
| ORDERS | hasColumn | ORDER_DATE |
| ORDERS | hasColumn | ZIP |
| ORDERS | hasColumn | FREIGHT_CHARGES |
| ORDERS | hasColumn | ORDER_POSTED_DT |
| ORDERS | hasColumn | ORDER_SHIP_DT |
| ORDER_DETAILS | hasColumn | ORDER_ID |
| ORDER_DETAILS | hasColumn | ITEM_ID |
| ORDER_DETAILS | hasColumn | ITEM_QTY |
| ITEMS | hasColumn | ITEM_ID |
| ITEMS | hasColumn | ITEM_DESC |
| ITEMS | hasColumn | ITEM_CATEGORY |
| ITEMS | hasColumn | ITEM_RATING |
| ITEMS | hasColumn | UNIT_PRICE |
| ITEMS | hasColumn | ON_HAND_INVENTORY |
| ITEMS | hasColumn | ORDER_SHIP_DT |

FIG. 6

| Domain | Property | Range |
|---|---|---|
| SHIP_TO | hasColumn | SHIP_ID |
| SHIP_TO | hasColumn | ORDER_ID |
| SHIP_TO | hasColumn | CUST_ID |
| SHIP_TO | hasColumn | SHIP_TO_ADDRESS |
| SHIP_TO | hasColumn | STATE |
| SHIP_TO | hasColumn | ZIP |
| SHIP_TO | hasColumn | IN_CARE_OF |
| SHIP_TO | hasColumn | SHIPPING_CHANGE_DT |
| Sales_Analysis | hasMeasure | SALES_AMT |
| Sales_Analysis | hasKey | TIME_ID |
| Sales_Analysis | hasKey | CUSTOMER_ID |
| Sales_Analysis | hasKey | ITEM_ID |
| Sales_Analysis | hasKey | SALESMAN_ID |
| Sales_Analysis | hasDimension | Customer_Dim |
| Sales_Analysis | hasDimension | Item_Dim |
| Sales_Analysis | hasDimension | Salesman_Dim |
| Sales_Analysis | hasDimension | Time_Dim |
| Customers_Dim | hasMember | CUSTOMER_ID |
| Customers_Dim | hasMember | CUSTOMER_NM |
| Customers_Dim | hasMember | CUST_TYPE |
| Item_Dim | hasMember | ITEM_ID |
| Item_Dim | hasMember | ITEM_NM |
| Salesman_Dim | hasMember | SALESMAN_ID |
| Salesman_Dim | hasMember | SALESMAN_NM |
| Time_Dim | hasMember | TIME_ID |
| Time_Dim | hasMember | DATE |
| Customers_Dim | hasKey | CUSTOMER_ID |
| Item_Dim | hasKey | ITEM_ID |
| Salesman_Dim | hasKey | SALESMAN_ID |
| Time_Dim | hasKey | TIME_ID |

FIG. 6 (Con't)

| Domain | Property | Range |
|---|---|---|
| EOQ_Report | hasKey | TIME_ID |
| EOQ_Report | hasAttribute | Company_Name |
| EOQ_Report | hasAttribute | Category |
| EOQ_Report | hasAttribute | Item_Description |
| EOQ_Report | hasAttribute | Date |
| EOQ_Report | hasAttribute | Sales_Amount |
| EOQ_Report | hasAttribute | Sales_Quantity |
| EOQ_Report | hasFilterParam | Category |
| EOQ_Report | hasQueryFile | Eoq-category.dot.sql |
| Eoq-category.dot.sql | hasLocation | C.colon.slash |

615 { row 1
616 { rows 2–7
617 { rows 8–10

FIG. 6 (Con't)

METHOD AND APPARATUS FOR FUNCTIONAL INTEGRATION OF METADATA

CROSS-REFERENCE TO RELATED APPLICATIONS

The present application is a continuation-in-part of co-pending U.S. patent application Ser. No. 12/179,903, filed on Jul. 25, 2008.

BACKGROUND

Multiple data models, and the consequent databases, allow business processes to be automated through both custom-built applications and commercial off-the-shelf software package-built applications. Each data model rests upon its own domain of attributes, defined by data schemas. Often, the same business entities exist concurrently in several data schemas, with a combination of database schemas for relational databases and non-relational databases, such as Cubes, Reports, Dashboards, and Scorecards. Often, the attributes defined by the data schemas are differently named, data-typed and constraint-typed. This leads to the multiplicity of definitions of business entities, which creates problems in data integration endeavors, particular in those directly concerned with information access and analysis.

Two approaches to the problem of data integration include a federated database approach and a data warehousing approach. The federated database approach brings attributes from different data schemas together within a single context or catalog. However, there are two drawbacks. Although the federated database approach accomplishes the structural integration of data, it fails in the functional integration of data. In a federated database, entities are individually cataloged. However, the federated database fails to reconstruct the conceptual entities. For example, assume that a business entity named Orders refers to a family of entities, where an Order has many Items and an Item has many Ship-to destinations. This family of entities would have at least three entities as a consequence of data decomposition under the federated database approach. However, the entity Orders is not reconstructed as a single conceptual entity with the child entities Item and Ship-to. Further, the federated approach does not deal with the metadata of non-relational data schemas.

The data warehousing approach makes a copy of related entities/tables and transforms them into a single entity/table. For example, the entities/tables Customers and Customer Types are placed within a single Customer dimension table by means of denormalization. However, such transformation cannot be accomplished with transaction tables such as Orders and Payments.

Furthermore, the known approaches require that users have a perfect knowledge of the underlying database structures in order to access the data. This requirement is impractical for business users to learn the intricacies of the databases. Thus, data integration projects require architects to acquire perfect knowledge of databases involved, which is a costly, time consuming, and impractical process.

BRIEF SUMMARY

According to one embodiment of the present invention, a computer implemented method for functional integration of metadata for a plurality of databases, includes: creating a single set of classes and instances for the classes for metadata of at least one relational data schema and at least one non-relational data schema for the plurality of databases; creating a single set of semantic relationships between the instances based on structural information in the relational data schema and the non-relational data schema; and storing the single set of semantic relationships in a file.

In one aspect of the present invention, the creating the single set of classes and instances for the classes for the metadata of the relational data schema and the non-relational data schema for the plurality of databases includes: creating the single set of classes for the metadata of the relational data schema and the non-relational data schema for the plurality of databases; creating the single set of the instances for the classes; and associating the instances with the classes.

In one aspect of the present invention, the creating the single set of the semantic relationships between the instances based on the structural information in the relational data schema and the non-relational data schema includes: defining the semantic relationships between the instances based on the structural information in the relational data schema and the non-relational data schema for the plurality of databases; associating the semantic relationships with a property class; and creating a single set of triples for the semantic relationships between the instances.

In one aspect of the present invention, each of the triples comprise a pair of instances of the set of instances and a property linking together the pair of instances.

In one aspect of the present invention, the single set of triples are stored in the file.

In one aspect of the present invention, the set of triples stored in the file are used to navigate between the plurality of databases to formulate a response to a query.

System and computer program products corresponding to the above-summarized methods are also described and claimed herein.

BRIEF DESCRIPTION OF THE SEVERAL VIEWS OF THE DRAWINGS

FIGS. 5-6 illustrate an example of the functional integration of metadata of the data schemas according to an embodiment of the present invention.

DETAILED DESCRIPTION

Figure 1:
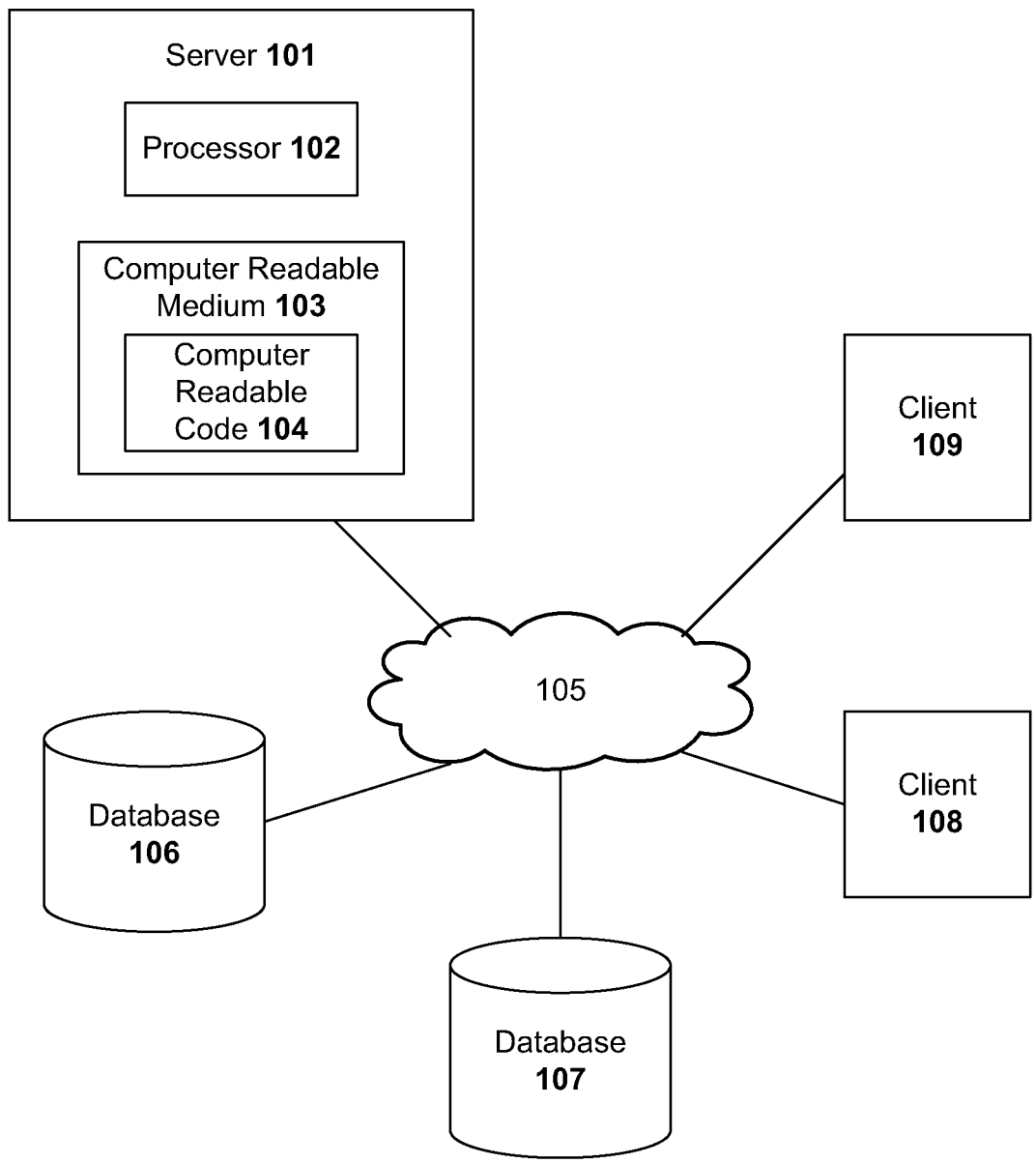
FIG. 1 illustrates an embodiment of a system for the functional integration of metadata of data schemas for relational and non-relational databases.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (Java, and all Java-based trademarks and logos are trademarks of Sun Microsystems, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

FIG. 1 illustrates an embodiment of a system for the functional integration of metadata of data schemas for relational and non-relational databases. The system includes a network 105, which is the medium used to provide communications links between various devices. The devices includes a server 101 connected to databases 106-107 and clients 108-109. The server 101 is operationally coupled to a processor 102 and a computer readable medium 103. The computer readable medium stores computer readable program code 104 for implementing the method of the present invention. The processor 102 executes the program code 104 to functionally integrate metadata of data schemas for relational and non-relational databases according to the various embodiments of the present invention.

The embodiments of the method of the present invention accomplish reverse data decomposition, a process for the functional integration of metadata of data schemas for relational and non-relational databases, where the attributes, and other metadata artifacts from the functional decomposition of data, are integrated into a single, unified conceptual schema. Non-relational databases include data that are derived from a relational database, such as Cubes and Reports.

In one embodiment, the method employs the frame-based knowledge representation technique and the dialect of the Web Ontology Language (OWL). OWL includes classes, individuals, and properties. A class defines a group of individuals that belong together because they share some properties. Individuals are instances of classes, and properties may be used to relate one individual to another. Properties can be used to state relationships between individuals or from individuals to data values. OWL represents the content of information through "triples", using the format <domain><property><range>. The properties link together instances drawn from their respective classes based on the structural information in the data schemas.

Figure 2:
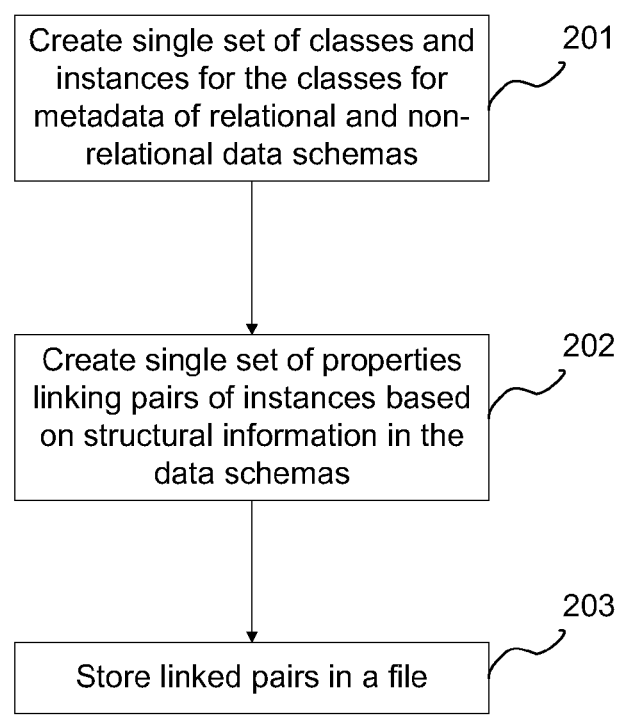
FIG. 2 is a flowchart illustrating an embodiment of a method for the functional integration of metadata of data schemas for relational and non-relational databases.

FIG. 2 is a flowchart illustrating an embodiment of a method for the functional integration of metadata of data schemas for relational and non-relational databases. The method first creates a single set of classes and instances of the classes for metadata of relational and non-relational data schemas (201). The method then creates a single set of semantic relationships between instances based on the structural information in the data schemas (202). The semantic relationships are stored in a file (203), which may be used as a single point of entry for the multiple data schemas for relational and non-relational databases.

Figure 3:
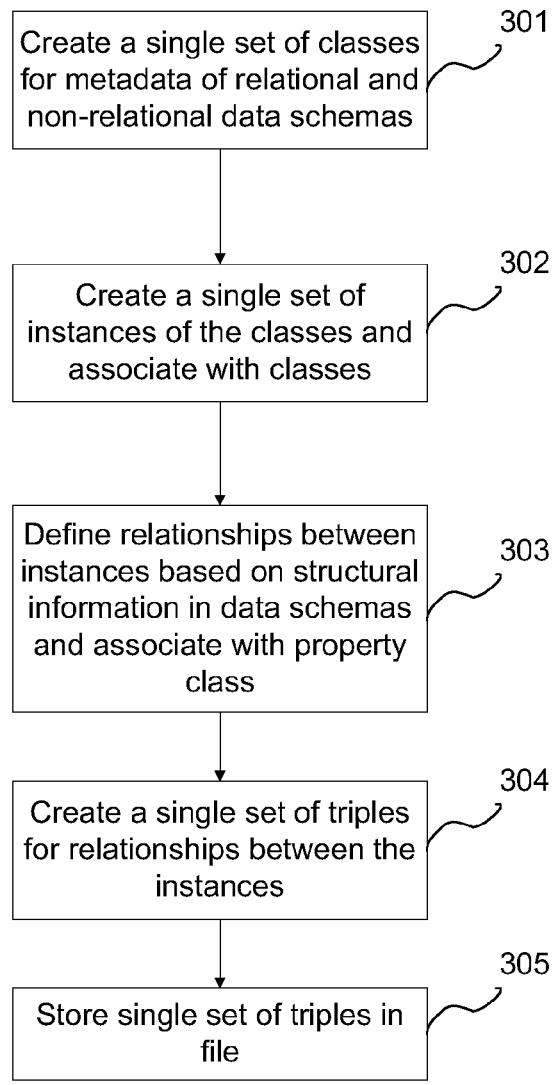
FIG. 3 is a flowchart illustrating in more detail the embodiment of the method for the functional integration of metadata of data schemas for relational and non-relational databases.

FIG. 3 is a flowchart illustrating in more detail the embodiment of the method for the functional integration of metadata of data schemas for relational and non-relational databases. The method creates a single set of classes for the metadata of the relational and non-relational data schemas (301). The method also creates a single set of instances of the classes, where the instances are associated with the classes (302). The method further defines semantic relationships between the instances based on the structural information in the data schemas and associates the relationships with a property class (303). Then a single set of triples are created for the semantic relationships between the instances (304). The triples are stored in a file (305), where it may be used as the single point of entry for the multiple data schemas for relational and non-relational databases.

Figure 4A:
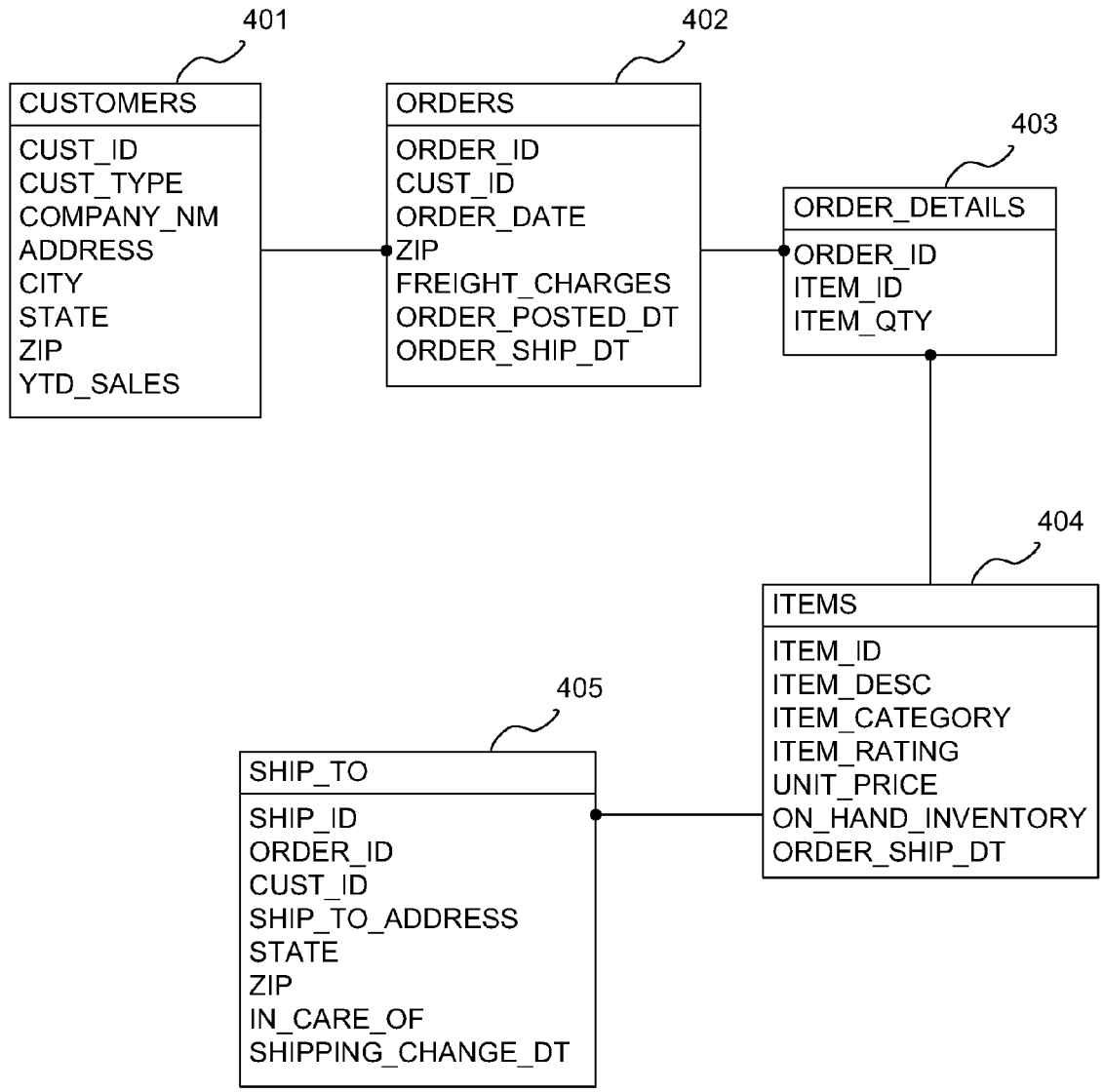
FIGS. 4A-4C illustrate example data schemas for relational and non-relational databases.
Figures 4B, 4C:
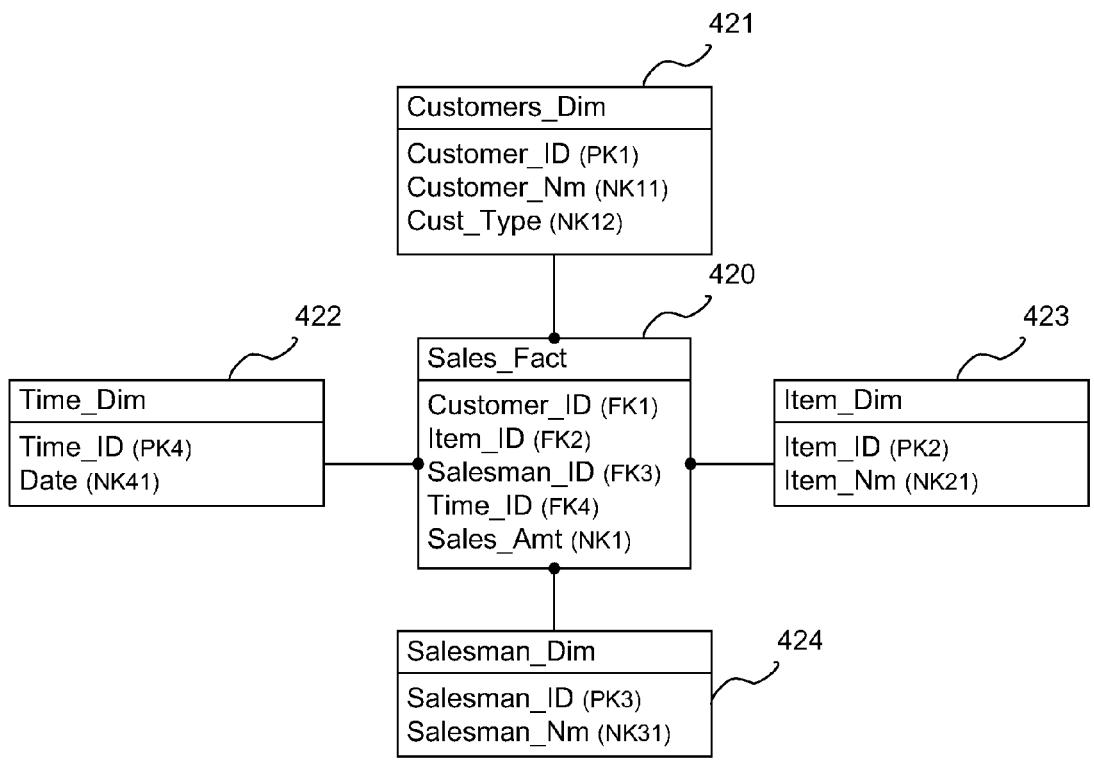

FIGS. 4A-4C illustrate example data schemas for relational and non-relational databases. Assume three databases: a relational database, ABC_DB; a Report, EOQ_Report; and a Cube, Sales_Analysis.

FIG. 4A illustrates the example data schema for ABC_DB. In this example, ABC_DB defines a relational database with five tables: Customers 401, Orders 402, Order_Details 403, Items 404, and Ship_To 405. The Customers table 401 has eight columns: Cust_ID, Cust_Type, Company_NM, Address, City, State, Zip, and YTD_Sales. The Orders table 402 has six columns: Order_ID, Cust_ID, Order_Date, Zip, Freight_Charges, Order_Posted_DT, and Order_Ship_DT. The Order_Details table 403 has three columns: Order_ID, Item_ID, and Item_Qty. The Items table 404 has seven columns: Item_ID, Item_Desc, Item_Category, Item_Rating, Unit_Price, On_Hand_Inventory, and Order_Ship_DT. The Ship_To table 405 has eight columns: Ship_ID, Order_ID, Cust_ID, Ship_To_Address, State, Zip, In_Care_Of, and Shipping_Change_DT.

FIG. 4B illustrates the example data schema EOQ_Report. In this example, EOQ_report has four attributes. The attribute "Report_Name" 410 has the value "EOQ_Report" 411; the attribute "Filter_Parameter" 412 has the value "Category" 413; the attribute "Query_File_Name" 414 has the value "Eoq-category.sql" 415; and the attribute "Query_File_Location" 416 has the value "C:\" 417. Assume that in the query file "Eoq-category.sql" at location "C:\:" contains attributes Company_Name, Item_Description, Date, Sales_Amount, and Sales_Quantity (not shown).

FIG. 4C illustrates the example data schema Sales_Analysis. In this example, Sales_Analysis has a fact table, Sales_Fact 420, and five dimension tables, Customers_Dim 421, Time_Dim 422, Item_Dim 423, and Salesman_Dim 424. The Sales_Fact table 420 has the measure, Sales_Amt, and four dimensions, Customers_ID, Item_ID, Salesmam_ID, and Time_ID. The Customers_Dim table 421 has three members, Customer_ID, Customer_Nm, and Cust_Type, with Customer_ID as the primary key. The Time_Dim table 422 has two members, Time_ID and Date, with Time_ID as the primary key. The Item_Dim table 423 has two members, Item_ID and Item_Nm, with Item_ID as the primary key. The Salesman_Dim table 424 has two members, Salesman_ID and Salesman_Nm, with Salesman_ID as the primary key.

FIGS. 5-6 illustrate an example of the functional integration of metadata of the data schemas according to an embodiment of the present invention. FIG. 5 illustrates classes and instances created by the embodiment of the method of the present invention. Referring to FIGS. 3 and 5, the embodiment of the method of the present invention creates a single set of classes for the metadata of the data schemas for ABC_DB, EOQ_Report, and Sales_Analysis (301). The classes include Databases, Tables, Columns, Cubes, Fact_Tables, Dimension_Tables, Dimension_Members, Fact_Measures, Report_Names, Report_Attributes, Filter_Parameters, Query_File_Names, and Query_File_Locations. The method further creates a single set of instances of the classes, where the instances are associated with the classes (302). As illustrated in FIG. 5, for ABC_DB, the instance 501 of the database is associated with the Databases class 502. The instances 503 of the tables of ABC_DB are each associated with the Tables class 504. The instances 505 of the columns of the tables of ABC_DB are each associated with the Columns class 506.

For Sales_Analysis, the instance 507 of the cube is associated with the Cubes class 508. The instance 509 of the Sales_Fact table 420 is associated with the Fact_Tables class 510. The instances 511 of the dimension tables 421-424 of Sales_Analysis are each associated with the Dimension_Tables class 512. The instances 513 of the members of the dimension tables 421-424 are each associated with the Dimension_Members class 514. The instance 515 of the measure for the Sales_Fact table 420 is associated with the Fact_Measures class 516.

For EOQ_Report, the instance 517 of the report is associated with the Report_Names class 518. The instances 519 of the attributes of the report are each associated with the Report_Attributes class 520. The instance 521 of the Category attribute is associated with the Filter_Parameters class 522. The instance 523 of Eoq-catogry.dot.sql is associated with the Query_File_Names class 524. The instance 525 of the C.Colon.Slash is associated with the Query_File_Locations class 526.

The method also defines the semantic relationships between the instances based on the structural information in the data schemas and associates the semantic relationships with a property class (303). As illustrated in FIG. 5, the defined relationships 527 include hasTable, hasColumn, hasMeasure, hasKey, hasDimension, hasMember, hasAttribute, hasFilterParam, and has QueryFile. These relationships 527 are associated with the property class 528.

From the classes and instances, the method creates a single set of triples for the semantic relationships between the instances (304). FIG. 6 illustrates triples created by the embodiment of the method of the present invention. Each triple defines a relationship between instances. For example, for the ABC_DB database, triples 601 indicate that the ABC_DB database has the Customers 401, Orders 402, Order_Details 403, Items 404, and Ship_To 405 tables. Triples 602 indicate that the Customers table 402 has the Cust_ID, Cust_Type, Company_Nm, Address, City, State, Zip, and YTD_Sales columns. Triples 603 indicate that the Orders table 402 has the Order_ID, Cust_ID, Order_Date, Zip, Freight_Charges, Order_Posted_DT, and Order_Ship_DT columns. Triples 604 indicate that the Order_Details table 403 has the Order_ID, Item_ID, and Item_Qty columns. Triples 605 indicate that the Items table 404 has the Item_ID, Item_Desc, Item_Category, Item_Rating, Unit_Price, On_Hand_Inventory, and Order_Ship_DT columns. Triples 606 indicate that the Ship_To table 405 has the Ship_ID, Order_ID, Cust_ID, Ship_To_Address, State, Zip, In_Care_Of, and Shipping_Change_DT columns.

For the Sales_Analysis cube, the triple 607 indicate that the cube has Sales_Amt as the measure. The triples 608 indicate that the cube has Time_ID, Cust_ID, Item_ID, and Salesman_ID as (foreign) keys. The triples 609 indicate that the cube has the Customers_Dim 421, Item_Dim 423, Salesman_Dim 424, and Time_Dim 422 dimension tables. The triples 610 indicate that the Customers_Dim table 421 has Customer_ID, Customer_Nm, and Cust_Type as members. The triples 611 indicate that the Item_Dim table 423 has Item_ID and Item_Nm as members. The triples 612 indicate that the Salesman_Dim table 424 has Salesman_ID and Salesman_Nm as members. The triples 613 indicate that the Time_Dim table 423 has Time_ID and Date as members. The triples 614 indicate that the Customers_Dim 421, Item_Dim 423, Salesman_Dim 424, and Time_Dim 422 tables have Cust_ID, Item_ID, Salesman_ID, and Time_ID as (primary) keys, respectively.

For EOQ_Report, the triple 615 indicates that the report has Time_ID as a key. The triples 616 indicate that the report has Company_Name, Category, Item_Description, Date, Sales_Amount, and Sales_Quantity as attributes. The triples 617 indicate that the EOQ_Report has Category as a filter parameter, Eoq-cateogry.sql as a query file name, and C:\ as a location of the query file.

The triples illustrated in FIG. 6 are stored in a file (305), where it may be used as the single point of entry for the multiple data schemas for relational and non-relational databases. Using the triples stored in the file, chains of metadata may be constructed, where the range of one triple may be used to link to the domain of another triple. Based on the similarity of the attribute or column name or value, the chains of metadata for relational databases may intersect with the chains of metadata for non-relational databases, resulting in a unified ontological schema which accounts for multiple schemas. Further, the triples may be stored in a single file, providing a single point of entry to enter a query to databases with multiple schemas. The semantic relationships indicated by the triples stored in the file may be used to navigate between the relational and non-relational databases to formulate a response to the query. Knowledge of the underlying data structures is not required. Further, the triples in the file may be extended by constructing other triples through interferences.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer implemented method for functional integration of metadata for a plurality of databases, comprising:

creating a single set of classes and instances for the classes for metadata of at least one relational data schema and at least one non-relational data schema for the plurality of databases, wherein the single set of classes comprises first classes for the metadata and second classes for the instances of the first classes;

creating a single set of semantic relationships between the instances of the first classes and the second classes based on structural information in the relational data schema and the non-relational data schema;

creating a single set of triples for the semantic relationships between the instances of the first classes and the second classes; and storing the single set of triples in a single file;

wherein the creating the single set of the semantic relationships between the instances of the first classes and the second classes based on the structural information in the relational data schema and the non-relational data schema comprises:

defining the semantic relationships between the instances of the first classes and the second classes based on the structural information in the relational data schema and the non-relational data schema for the plurality of databases;

creating a first set of triples for the semantic relationships for the at least one relational data schema, wherein a range of one of the first set of triples links to a domain of another of the first set of triples forming a first chain of triples;

creating a second set triples for the semantic relationships for the non-relational data schema, wherein a range of one of the second set of triples links to a domain of another of the second set of triples forming a second chain of triples; and wherein the first chain and the second chain comprise matching attribute values.

2. The method of claim 1, wherein the creating the single set of classes and instances for the classes for the metadata of the relational data schema and the non-relational data schema for the plurality of databases comprises:

creating the single set of classes for the metadata of the relational data schema and the non-relational data schema for the plurality of databases, wherein the single set of classes comprises the first classes for the metadata and the second classes for the instances of the first classes;

creating the single set of the instances for the classes, wherein the single set of the instances comprises first instances for the first classes and second instances for the second classes;

associating the first instances with the first classes; and associating the second instances with the second classes.

3. The method of claim 1, wherein each of the triples comprise a pair of instances of the set of instances and a property stating a relationship between the pair of instances.

4. The method of claim 1, further comprising:

storing the first chain and the second chain in the single file; and using the matching attribute values of the first chain and the second chain to navigate between the plurality of databases to formulate a response to a query.

5. The method of claim 1, wherein the at least one non-relational data schema comprises a data schema for data derived from a relational database.

6. A computer program product for functional integration of metadata for a plurality of databases, the computer program product comprising:

a computer readable memory having computer readable program code embodied therewith, the computer readable program code configured to:

create a single set of classes and instances for the classes for metadata of at least one relational data schema and at least one non-relational data schema for the plurality of databases, wherein the single set of classes comprises first classes for the metadata and second classes for the instances of the first classes;

create a single set of semantic relationships between the instances of the first classes and the second classes based on structural information in the relational data schema and the non-relational data schema;

create a single set of triples for the semantic relationships between the instances of the first classes and the second classes; and store the single set of triples in a single file;

wherein the computer readable program code configured to create the single set of the semantic relationships between the instances of the first classes and the second classes based on the structural information in the relational data schema and the non-relational data schema is further configured to:

define the semantic relationships between the instances of the first classes and the second classes based on the structural information in the relational data schema and the non-relational data schema for the plurality of databases;

create a first set of triples for the semantic relationships for the at least one relational data schema, wherein a range of one of the first set of triples links to a domain of another of the first set of triples forming a first chain of triples;

create a second set triples for the semantic relationships for the non-relational data schema, wherein a range of one of the second set of triples links to a domain of another of the second set of triples forming a second chain of triples; and wherein the first chain and the second chain comprise matching attribute values.

7. The computer program product of claim 6, wherein the computer readable program code configured to create the single set of classes and instances for the classes for the metadata of the relational data schema and the non-relational data schema for the plurality of databases is further configured to:

create the single set of classes for the metadata of the relational data schema and the non-relational data schema for the plurality of databases, wherein the single set of classes comprises the first classes for the metadata and the second classes for the instances of the first classes;

create the single set of the instances for the classes, wherein the single set of the instances comprises first instances for the first classes and second instances for the second classes;

associate the first instances with the first classes; and associate the second instances with the second classes.

8. The computer program product of claim 7, wherein the computer readable program code is further configured to:

storing the first chain and the second chain in the single file; and use the matching attribute values of the first chain and the second chain to navigate between the plurality of databases to formulate a response to a query.

9. The computer program product of claim 6, wherein each of the triples comprise a pair of instances of the set of instances and a property stating a relationship between the pair of instances.

10. The computer program product of claim 6, wherein the at least one non-relational data schema comprises a data schema for data derived from a relational database.

11. A system, comprising:

a plurality of databases defined by at least one relational data schema and at least one non-relational data schema; and a server comprising a processor and a computer readable storage medium having computer readable program code embodied therewith, wherein when the computer readable program code is executed by the processor, causes the server to:

create a single set of classes and instances for the classes for metadata of the relational data schema and the non-relational data schema for the plurality of databases, wherein the single set of classes comprises first classes for the metadata and second classes for the instances of the first classes;

create a single set of semantic relationships between the instances of the first classes and the second classes based on structural information in the relational data schema and the non-relational data schema;

create a single set of triples for the semantic relationships between the instances of the first classes and the second classes; and store the single set of triples in a single file;

wherein when the computer readable program code configured to create the single set of the semantic relationships between the instances of the first classes and the second classes based on the structural information in the relational data schema and the non-relational data schema is executed by the processor, further causes the server to:

define the semantic relationships between the instances of the first classes and the second classes based on the structural information in the relational data schema and the non-relational data schema for the plurality of databases;

creating a first set of triples for the semantic relationships for the at least one relational data schema, wherein a range of one of the first set of triples links to a domain of another of the first set of triples forming a first chain of triples;
creating a second set triples for the semantic relationships for the non-relational data second set of triples forming a second chain of triples; and
wherein the first chain and the second chain comprise matching attribute values.

12. The system of claim 11, wherein when the computer readable program code configured to create the single set of classes and the instances for the classes for the metadata of the relational data schema and the non-relational data schema for the plurality of databases is executed by the processor, further causes the server to:
create the single set of classes for the metadata of the relational data schema and the non-relational data schema for the plurality of databases, wherein the single set of classes comprises the first classes for the metadata and the second classes for the instances of the first classes;
create the single set of the instances for the classes, wherein the single set of the instances comprises first instances for the first classes and second instances for the second classes;
associate the first instances with the first classes; and
associate the second instances with the second classes.

13. The system of claim 11, wherein each of the triples comprise a pair of instances of the set of instances and a property stating a relationship between the pair of instances.

14. The system of claim 11, wherein when the computer readable program code is executed by the processor, further causes the server to:
storing the first chain and the second chain in the single file; and
use the matching attribute values of the first chain and the second chain to navigate between the plurality of databases to formulate a response to a query.

15. The system of claim 11, wherein the at least one non-relational data schema comprises a data schema for data derived from a relational database.

16. A computer implemented method for functional integration of metadata for a plurality of databases, comprising:
creating a single set of classes and instances for the classes for metadata of at least one relational data schema and at least one non-relational data schema for the plurality of databases, wherein the single set of classes comprises first classes for the metadata and second classes for the instances of the first classes;
defining semantic relationships between the instances of the first classes and the second classes based on the structural information in the relational data schema and the non-relational data schema for the plurality of databases;
creating a first set of triples for the semantic relationships for the at least one relational data schema, wherein a range of one of the first set of triples links to a domain of another of the first set of triples forming a first chain of triples;
creating a second set triples for the semantic relationships or the non-relational data schema, wherein a range of one of the second set of triples links to a domain of another of the second set of triples forming a second chain of triples, wherein the first chain and the second chain comprise matching attribute values;
storing the first chain and the second chain in a single file; and
using the matching attribute values of the first chain and the second chain to navigate between the plurality of databases to formulate a response to a query.

17. The method of claim 16, wherein the at least one non-relational data schema comprises a data schema for data derived from a relational database.

18. A computer program product for functional integration of metadata for a plurality of databases, comprising:
a computer readable memory having computer readable program code embodied therewith, the computer readable program code configured to:
create a single set of classes and instances for the classes for metadata of at least one relational data schema and at least one non-relational data schema for the plurality of databases, wherein the single set of classes comprises first classes for the metadata and second classes for the instances of the first classes;
define semantic relationships between the instances of the first classes and the second classes based on the structural information in the relational data schema and the non-relational data schema for the plurality of databases;
create a first set of triples for the semantic relationships for the at least one relational data schema, wherein a range of one of the first set of triples links to a domain of another of the first set of triples forming a first chain of triples;
create a second set triples for the semantic relationships for the non-relational data schema, wherein a range of one of the second set of triples links to a domain of another of the second set of triples forming a second chain of triples, wherein the first chain and the second chain comprise matching attribute values;
store the first chain and the second chain in a single file; and
use the matching attribute values of the first chain and the second chain to navigate between the plurality of databases to formulate a response to a query.

19. The method of claim 18, wherein the at least one non-relational data schema comprises a data schema for data derived from a relational database.

* * * * *